(12) United States Patent
Distel

(10) Patent No.: US 7,469,455 B2
(45) Date of Patent: Dec. 30, 2008

(54) APPARATUS FOR PERFORMING STAMPING AND/OR MILLING, WELDING AND/OR BONDING OPERATIONS ON LARGE AREA, THREE-DIMENSIONAL PLASTICS PARTS

(75) Inventor: Armin Distel, Trossingen (DE)

(73) Assignee: Maschinenfabrik Spaichingen GmbH, Spaichingen (DE)

( * ) Notice: Subject to any disclaimer, the term of this patent is extended or adjusted under 35 U.S.C. 154(b) by 0 days.

(21) Appl. No.: 11/609,556

(22) Filed: Dec. 12, 2006

(65) Prior Publication Data

US 2007/0191198 A1    Aug. 16, 2007

(30) Foreign Application Priority Data

Dec. 14, 2005   (DE)  ................. 10 2005 060 026

(51) Int. Cl.
*B21J 15/00*    (2006.01)

(52) U.S. Cl. .................................. 29/34 R; 29/33 R

(58) Field of Classification Search .................. 29/428, 29/432, 465, 466, 557, 558, 560, 33 R, 34 R, 29/50, 54, 795; 156/513, 515, 517, 518; 293/155; 72/338, 381, 384, 389.1, 399, 456, 72/464, 469, 470; 409/143, 144, 183, 184; 83/469, 405, 515, 518, 667, 669, 682, 684
See application file for complete search history.

(56) References Cited

U.S. PATENT DOCUMENTS

| 3,940,970 | A | * | 3/1976 | Terral et al. ................. 29/34 B |
| 4,214,465 | A | * | 7/1980 | Rode ............................ 29/454 |
| 4,227,396 | A | * | 10/1980 | Crowe .......................... 72/469 |
| 4,732,631 | A | * | 3/1988 | Shimizu ...................... 156/515 |
| 4,738,018 | A | * | 4/1988 | Ebrahimian ................... 29/560 |
| 5,953,951 | A | * | 9/1999 | Fujimoto et al. ........... 72/379.6 |
| 6,134,938 | A | * | 10/2000 | Ohtsuka ....................... 72/470 |
| 6,301,777 | B1 | * | 10/2001 | Sigler et al. .................... 29/753 |
| 7,267,736 | B2 | * | 9/2007 | Hou et al. ................. 29/525.06 |
| 7,270,527 | B2 | * | 9/2007 | Ide et al. ........................ 83/682 |
| 2002/0100534 | A1 | * | 8/2002 | Distel ......................... 156/73.1 |
| 2005/0223549 | A1 | | 10/2005 | Braun | |
| 2005/0233549 | A1 | | 10/2005 | Braun | |

FOREIGN PATENT DOCUMENTS

| DE | 10 2004 018 309 | 11/2005 |
| EP | 1 468 794 | 10/2004 |
| EP | 1 586 427 | 10/2005 |
| WO | 2004/058447 | 7/2004 |

OTHER PUBLICATIONS

EPO Computer Translation of EP 1468794 (Publication date Oct. 20, 2004) printed out on Feb. 14, 2008.*

* cited by examiner

*Primary Examiner*—Dana Ross
(74) *Attorney, Agent, or Firm*—Michael J. Striker

(57) ABSTRACT

An apparatus for sequentially effected performance of stamping and milling, welding and/or bonding operations on large area parts, e.g. fenders for motor vehicles, includes a holder for the plastic parts is stationary, as well as an underneath tool and an upper tool which are provided with tools so arranged, formed and movably mounted relative to the holder that the stamping and milling, welding and/or bonding operations can be performed one after the other and without altering the position of the plastic parts.

22 Claims, 5 Drawing Sheets

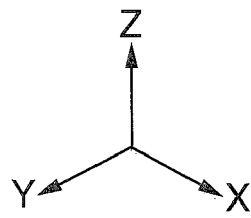
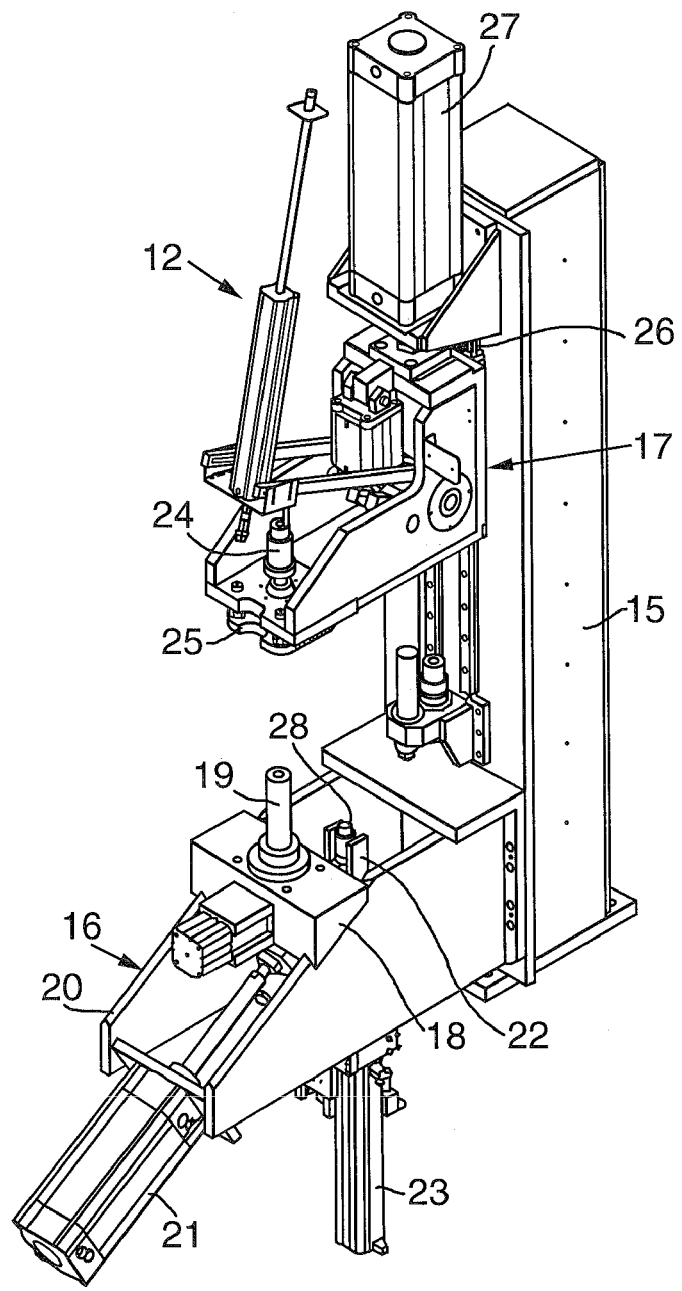
Fig.4.

APPARATUS FOR PERFORMING STAMPING AND/OR MILLING, WELDING AND/OR BONDING OPERATIONS ON LARGE AREA, THREE-DIMENSIONAL PLASTICS PARTS

CROSS REFERENCE TO A RELATED APPLICATION

The invention described and claimed hereinbelow is also described in German Patent Application DE 10 2008 060 026.3 filed on Dec. 13, 2005 . This German Patent Application provides the basis for a claim of priority of invention under 35 U.S.C. 1 19(a)-(d).

FIELD OF THE INVENTION

The present invention relates to an apparatus for sequentially effected performance of stamping and milling, welding and/or bonding operations on large area, three-dimensional plastic parts for motor vehicles, especially fenders, with at least one holder for the plastics parts and a lower, or underneath, tool and an upper tool, wherein the underneath tool and the upper tool comprise tools which are mounted movably at least partially parallel to or in the direction of a predetermined axis and serve first to provide the plastic parts with a stamped hole and then to perform at least one further processing step in the region of the stamped hole by milling, welding, and/or bonding.

BACKGROUND OF THE INVENTION

Apparatuses of this type, which are also called stamping/welding machines, find a preferred use in the production of large area, three-dimensional parts such as fenders (bumpers), spoilers, body panels or the like for example, for use in the automobile industry. The object here is for example to provide the plastics part with at least one hole by stamping in a first working step. Then, in a second working step, receiving parts (adapters) for various supplementary devices are to be fitted in these holes and fixed therein by welding or bonding. The supplementary devices can for example be parking sensors, headlight cleaning systems, trailer towing devices, exhaust systems or trim strips. The holes can, depending on the case, be round blind holes or open edged break-outs with cross-sections dependent on the individual case. The fixing of the receiving parts in the holes can be effected by ultrasonic or laser welding or the like or by bonding. It is often also required to shape the stamped holes conically by milling.

On account of the two or more associated working steps it is known (e.g. DE 10 2004 018 309 A1) to provide combined stamping and welding or bonding devices. These are so constructed that the fender is placed in a receptacle arranged at a front side of the apparatus or machine and mounted on a sliding table, whereafter the sliding table is driven by a motor or the like to a stamping frame which is arranged at a rear side of the apparatus, in order then to stamp the required holes there. The sliding table is then driven back to the front side, in order to fit the receiving parts into the stamped holes, which parts have previously been fitted on to feed arbors arranged in the welding area, and then to fix them therein. A disadvantage with this is on the one hand that two separate working areas and a sliding table which can move to and fro between them are required, which demands a lot of space and expensive drives and sliding table constructions. On the other hand, it is difficult to shift large parts such as fenders or the like as a whole with such high precision that the stamped holes produced in a first work area are positioned exactly relative to the following processing tools after the displacement of the plastic parts into a second work area. A small offset of a few tenths of a millimeter can be enough to lead to optically unattractive and thus unacceptable irregularities on the outer surfaces of the workpieces.

SUMMARY OF THE INVENTION

Because of this, an object of the present invention is to so design the apparatus of the type initially specified that two or more work areas with sliding tables arranged between them are not required.

Another object of present invention is to so design the apparatus, that The plastics parts can be held stationary during seguentially performed stamping And milling, welding and/or bonding operations.

Yet another object is to design the apparatus such that both tool changes And workpiece changes can be carried out in a simple manner.

These and other objects are solved in accordance with the present invention in that the holder is stationary, the tools of the underneath or upper tools are mounted on a bracket movable transversely to the axis and a means for moving the bracket is so provided that the tools mounted thereon can be brought successively into an operating position, which is established by a predetermined working side of the plastics part.

The invention has the advantage that the plastics parts to be machined do not have to be driven to and fro between two work areas but are kept stationary during the processing while the tools are moved appropriately instead. This saves the previously customary sliding table and requires no additional adjustments for producing a given position of the plastics parts in the respective work area. If the at least one processing station is formed as a whole as an interchangeable module, any number of interchangeable modules for different workpieces and/or different processing functions can in principle be prepared outside the apparatus and held in store. A machine based on such a concept is suitable in particular in apparatuses with a plurality of processing stations as well as for small series, since only the interchangeable module has to be exchanged in these cases, while the base unit can stay the same.

BRIEF DESCRIPTION OF THE DRAWINGS

The invention will be explained in more detail in conjunction with the accompanying drawings of an embodiment currently considered the best. These show:

FIGS. 4 and 5 perspective views of a processing station according to the invention of the apparatus according to FIGS. 1 to 3 in different working positions and with omission of a workpiece holder and the associated workpiece.

DETAILED DESCRIPTION OF THE PREFERRED EMBODIMENTS

Figure 1:
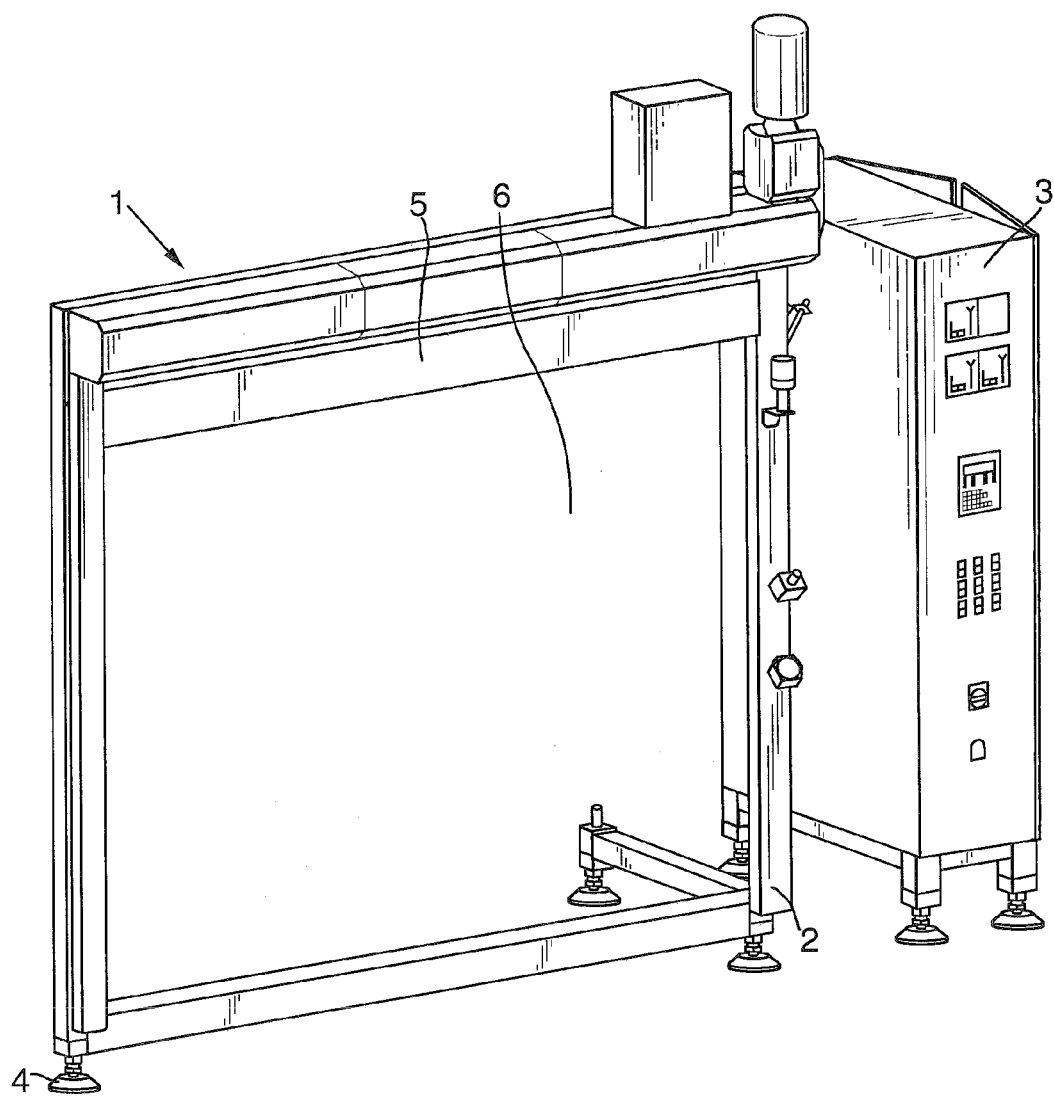
FIG. 1 a base unit of an apparatus according to the invention in a perspective view.

FIG. 1 shows a base unit 1 of an apparatus according to the invention for performing stamping and milling, welding and/or bonding work. The base unit 1 in the embodiment includes a base rack 2 shown only very schematically and a control cabinet 3 in which are fitted the devices required for carrying out the various operations, e.g. electrical, electronic and/or pneumatic devices. The base rack 1 stands on feet 4 and advantageously comprises at its front side a frame formed from suitable frame parts, which surrounds an opening 6 and has a rectangular or square cross-section.

At least one interchangeable module 7 (FIG. 2) is associated with the base unit 1 according to FIG. 1 and all parts needed to perform a given processing function are fitted therein. The interchangeable module 7 includes in particular a support plate 8 which is preferably supported on feet, in such a way that there is a free space between it and the ground, into which the forks of a hoist or fork lift truck can be driven for transport of the interchangeable module 7. Alternatively, it would be equally possible to mount the support plate 8 movably on rollers or wheels.

A holder or holding fixture 9 not shown in more detail is supported on a front side of the support plate 8 and serves to support a workpiece in the form of a plastics part 10 with clamp means or the like known per se and therefore not further explained, such as is described in DE OS 10 2004 018 309 A for example, which is hereby made subject matter of the present disclosure by reference, to avoid repetition. The plastics part 10 is a gently curved fender for a motor vehicle in the case of the example, U-shaped in cross-section for example.

At least one pedestal 11 is further fitted on the support plate 8 and at least one processing station 12 is fixed thereon; its mode of operation is explained in more detail below with reference to FIGS. 4 and 5. Four such processing stations 12 are present in the embodiment and are arrayed in the longitudinal direction of the plastics part 10 and can assume different angular positions relative to it and are mounted alongside one another on two of the pedestals 11. The number and relative positions of the processing stations 12 depends inter alia on the shape and size of the plastics part 10 and the processing function to be met.

Figure 2:
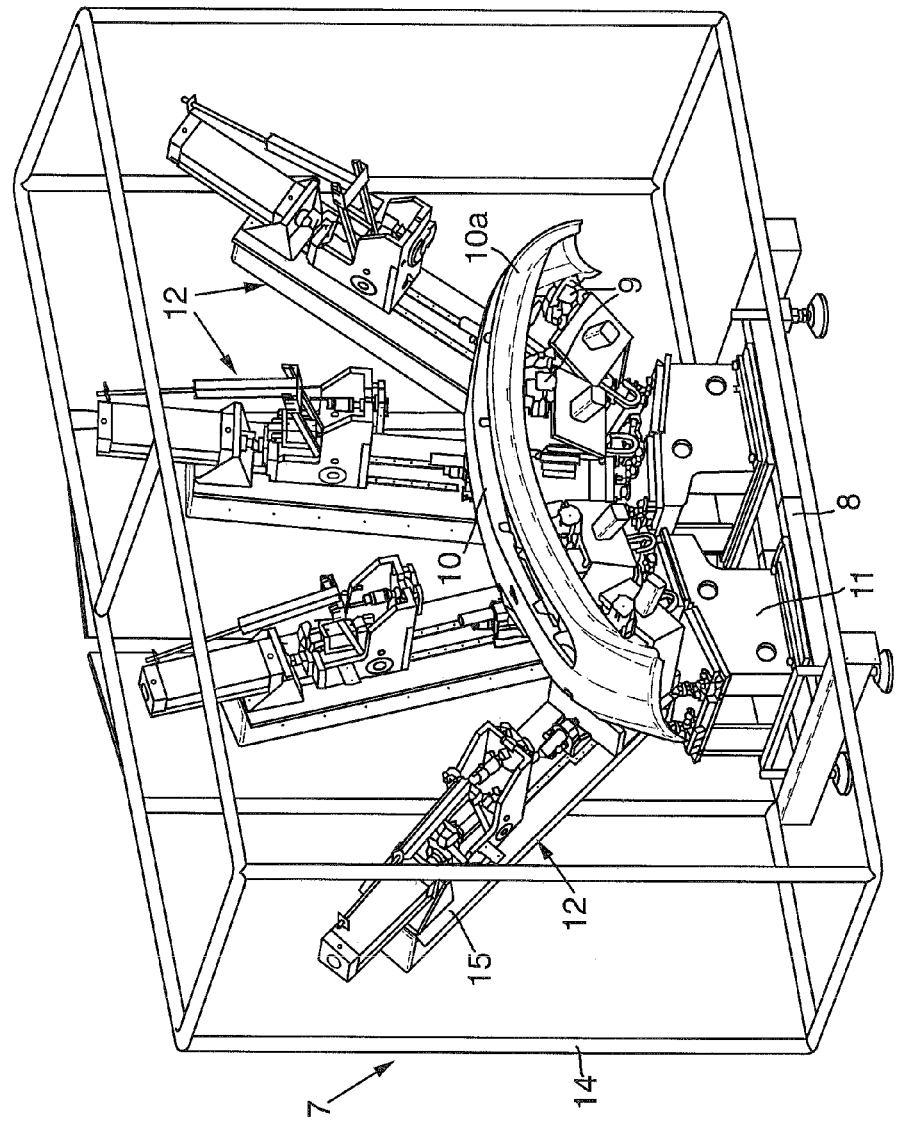
FIG. 2 an interchangeable module for the base unit according to FIG. 1 in a perspective view.
Figure 3:
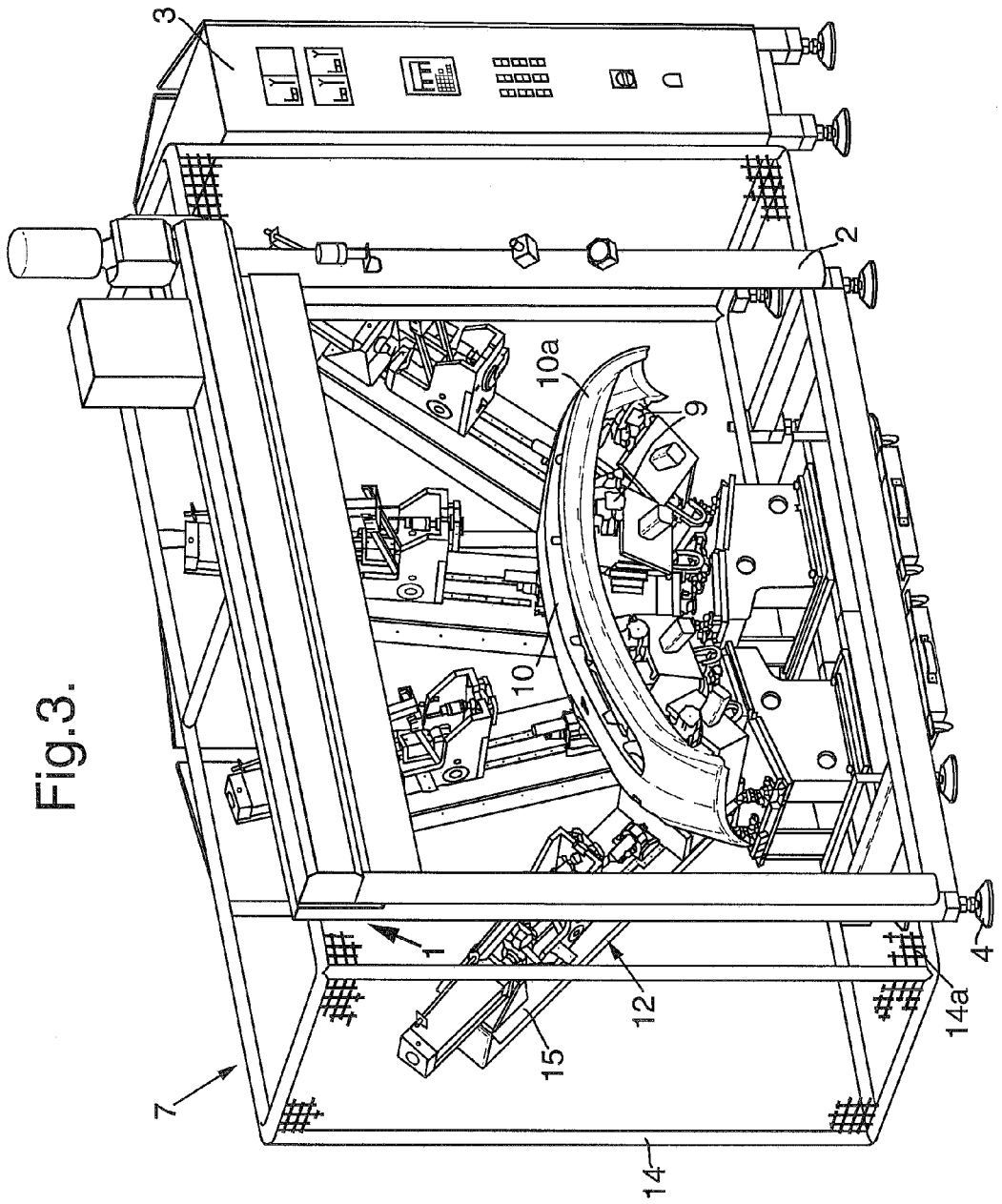
FIG. 3 the base unit according to FIG. 1 with a fitted interchangeable module according to FIG. 2 in a perspective view.

As FIG. 3 shows, the interchangeable module 7 can be introduced with its front side ahead from the rear into the base frame 2, until for example it bears on the rear side of the frame 5 and thereby assumes a desired processing position. In this position the holder 9 arranged stationary in the processing station 12 is accessible through the opening 6 for loading and taking out the plastics parts 10. In order to avoid injury to the operator, normal safety measures are preferably provided at the front part of the frame 5 of the base frame 2, for example means for creating a light barrier, or a roll shutter or the like arranged there. In addition the baseplate 8 can be surrounded as shown in FIGS. 2 and 3 by a frame 14 with a protective grille 14*a* (FIG. 3). Alternatively and preferably however the base frame 2 is provided with suitable rods and a suitable protective grille, in which case the interchangeable module 7 essentially includes just the support plate 8 and the processing stations 12 fixed thereon, while the base frame 2 forms a housing for the interchangeable module 7.

Furthermore, if needed means (not shown) can be provided to attach the interchangeable module 7 fixedly on the base frame 2 in its processing position as seen in FIG. 3. However, it suffices in principle for the interchangeable module 7 to be fixed in the processing position by means of a brake or the like, since accurate positioning relative to the base frame 2 for working the plastics parts 10 is not necessary.

The devices fitted in the control cabinet 3 involve for example electrical power supply components, pneumatic assemblies for controlling pneumatic cylinder/piston arrangements, electronic control devices, ultrasonic generators for operating sonotrodes or the like, i.e. such devices as are needed for the operation of the tools provided in the processing stations 12. These devices are provided with corresponding supply lines, though this is not shown in detail, such as electrical cables, pneumatic hoses or the like for example, which are connected to connector elements fitted on the processing stations 12 with the aid of plug-in connectors or other quick couplings.

The mode of operation of the apparatus described thus far is essentially as follows:

So long as a particular kind of workpiece, e.g. the plastics part 10, is to be processed, the interchangeable module 7 remains in the base frame 2. The control of the respective tools is then effected from the control cabinet 3 according to a predetermined program. If a change of the plastics parts is required, the interchangeable module 7 is moved out of the base frame 2, e.g. with a fork lift truck, after disconnecting it from the supply lines, and is replaced with a new, already fully set up interchangeable module 7. After the renewed connection of the supply lines, processing of the other plastics parts can be started straight away. No kinds of adjusting operations or the like are needed, especially when all processing stations 12 required for a processing mode are accurately positioned relative to one another and to the holder 9, before the interchangeable module 7 is moved into the base frame 2.

A particular advantage of the described apparatus resides in that no troublesome re-tooling work is necessary when changing the plastics part to be worked; also no complete, new processing apparatus is needed. The base unit 1 consisting of the base rack 2 and the control cabinet 3 is on the contrary always the same. Programs required for different processing requirements can be taken care of by suitable software in the control cabinet 3.

In a preferred development it is provided to effect the exchange of the interchangeable modules 7 automatically. This can be effected for example in that the required interchangeable module 7 in question is called up from a store and changed over by means of a transport device like a paternoster or of any other kind. The control of this operation can be effected by means of a program likewise held in the control cabinet 3.

Figure 5:
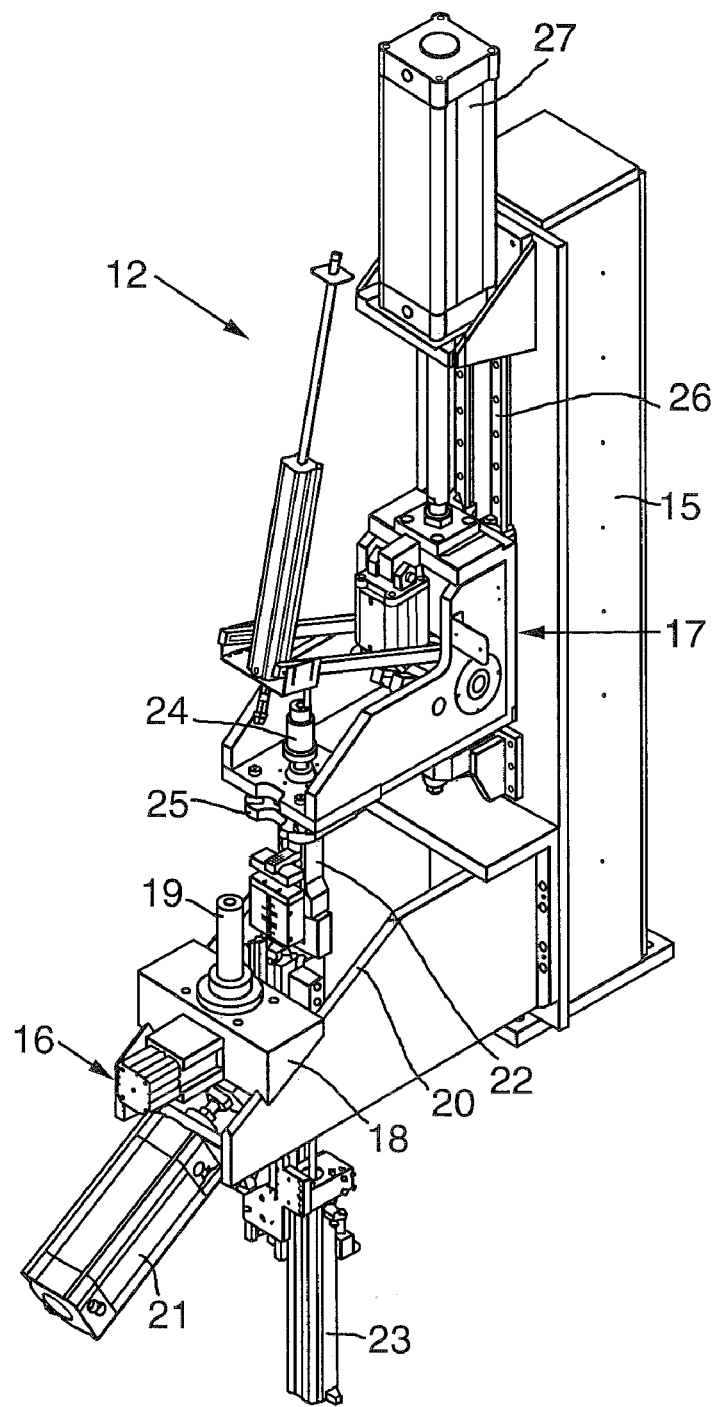

FIGS. 4 and 5 show a preferred embodiment of a processing station 12 according to the invention specially adapted for carrying out stamping and milling, welding or bonding operations. The processing station 12 comprises a frame 15 fixed stationary on the support plate 8 of the interchangeable module 7, with a rectangular or square cross-section, on which in particular are fixed an underneath tool denoted generally by the reference 16 and an upper tool denoted generally by the reference 17. The underneath tool 16 includes a bracket or pedestal 18 which is mounted movably relative to the frame 15 and to the holder 9, which along with the plastics part 10 are not shown in FIGS. 4 and 5 for reasons of clarity. When processing a plastics part 10 in the form of a fender according to FIGS. 2 and 3, whose longitudinal direction runs for example parallel to the x-axis indicated in FIG. 4 of a conceptual coordinate system, the bracket 18 is preferably movable transverse to the plastics part 10.

A first tool 19 in the form of a die required for a stamping operation is mounted on the bracket 18. A guide track 20 attached to the frame 5 is further provided, along which the bracket 18 can shift. This guide 20 runs not only transverse to the x-direction but preferably also inclined to the z-axis of the conceptual coordinate system, i.e. it forms an angle other than 90° with the xz-plane, such that the bracket 18 can be moved out of its position shown in FIG. 4 into a position shown in FIG. 5 and can thereby be lowered relative to the plastics part 10. Such an obliquely running guide 20 is especially advantageous when the plastics part 10 has a U-shaped cross-section in accordance with FIGS. 2 and 3 and is open downwards in its working position, since in this case the tool 19 can be moved down out of the plastics part 10 or fender, without colliding with the front or rear sidewalls 10a thereof (FIG. 2). A cylinder/piston arrangement 21 for example serves for moving the bracket 18, its piston rod being fixed to the bracket 18 and its cylinder to the processing station 12 or the frame 15 (or vice versa). However it would alternatively be possible to bring the tool 19 into a position in which the tool 19 assumes an out of operation position by turning the bracket 18, by shifting the bracket 18 in the x-direction or in some other way.

The underneath tool 16 is provided with a second tool 22 behind the tool 19 in the direction of movement of the bracket 18, this tool 22 also being fixed on the bracket 18 and preferably being a sonotrode in the case of plastics welding by ultrasound. Alternatively however, the tool 22 can equally be arranged for hot air, heat contact or laser welding for example. The tool 22 is additionally mounted movably transverse to the path of movement of the bracket 18 and therefore for example in the z-direction of the conceptual coordinate system. A further cylinder/piston arrangement 23 for example serves to move the tool 22, its cylinder being fixed on the bracket 18 and its piston rod on the tool 22 (or vice versa).

The upper tool 17 of the processing station 12 includes a third tool 24 for stamping, in the form of a stamp cooperating with the first tool 19 and with which a hold-down 25 for the plastics part 10 lying in the holder 9 is preferably associated. The hold-down 25 is arranged below the stamp 24, where the stamped hole is to be produced, with a passage for the stamp 24. The hold-down 25 is moreover arranged below the stamp 24 and is biased down from this in the z-direction by a spring, not shown. Alternatively, the stamp can be replaced by the sonotrode of a UV stamping device or by any other kind of stamp. The upper tool 17 can be moved as a whole up and down along a guide 26 fitted on the frame 15, i.e. here in the z-direction of the conceptual coordinate system. A cylinder/piston arrangement 27 for example serves to move the upper tool 17, with its piston rod fixed to the upper tool 17 and its cylinder to the frame 15 or the processing station 12 (or vice versa). All three cylinder/piston arrangements 21, 23 and 27 are preferably operated pneumatically.

Alternatively it would be possible to replace them by electric motors or other suitable drivers.

The mode of operation of the processing station 12 described with reference to FIGS. 4 and is essentially as follows:

After moving the interchangeable module 7 into the base frame 2, a plastics part 10 is placed on and fixed on the holder 9 through its front opening 6 (FIG. 1). The bracket 18 assumes the working position seen in FIG. 4, in which the die 19 is located directly at the site of the plastics part 10 where this is to be stamped. A stamping operation is then initiated through the control cabinet 3. The result of this is that the upper tool 17 is driven down by means of the cylinder/piston arrangement 27 in the z-direction from the position seen in FIG. 4, i.e. in the direction of the surface of the plastics part 10, as is shown in FIG. 5. The stamp 24 is aligned substantially coaxially with the die 19, so that the plastics part 10 is stamped in the provided location and is at the same time pressed against the receptacle by the hold-down 25. The location of the tools 19, 24 is given in particular by an axis which is here the stamping axis.

Following this, the cylinder/piston arrangement 21 is actuated, whereby the bracket 18 with the first tool 19 is moved obliquely downwards along the guide 20, into the out of operation position and is thus removed from the underside of the plastics part 10. At the same time the second tool 28 is moved under the previously formed stamped hole. The cylinder/piston arrangement 23 is then actuated, which raises the hitherto lowered welding tool 22 so far and so below the plastics part 10 as is necessary for a welding operation. This movement is possible in that the bracket 18 together with the first tool 19 has previously been moved away to the side. An arbor 28 (FIG. 4) is preferably associated with the welding tool 22, a receiving part or adapter being fitted on this manually or by automatic means before the welding operation or better before placing the plastics part on the holder 9. This arbor 28 is so formed and arranged, as is usual in ultrasonic welding, that it automatically places the adapter in the previously stamped opening on raising the welding tool 22 by means of the cylinder/piston arrangement 23. To this end the stamp 24 is previously driven upwards somewhat by actuation of the cylinder/piston arrangement 27, in order to free the stamped hole, while the hold-down 25 still presses the plastics part 10 against the holder 9 through the force of the spring. Both the stamping operation and the welding operation are thus performed in the embodiment at the same places of the plastics part 10 determined by the predetermined stamping axis. At the same time or before the welding operation the upper tool 17 or the hold-down 25 is preferably locked in the position seen in FIG. 5 for the duration of the welding operation, so that the hold-down 25 is not lifted because of a possible relaxation of pressure in the cylinder/piston arrangement 27, but continues to hold the plastics part 10 in position.

After completion of the welding operation then performed by means of the sonotrode 22 or the like, the cylinder/piston arrangements 21, 23 and 27 are actuated into the respective opposite directions, in order to produce the starting positions of the processing stations 12 according to FIG. 4, in which the finished plastics part 10 can be removed and replaced by a further plastics part 10 to be processed.

Should the adapter to be inserted be connected to the plastics part 10 by bonding, the welding tool 22 is replaced by a pressure plate for example, which clamps the adapter and the plastics part 10 between it and the hold-down 25, until an adhesive applied manually or automatically has hardened enough.

If it is desired to conically bore out the stamped hole or to bore it through conically from below, i.e. by milling with a conical inner bore or to provide a chamfer on the lower edge, the tool 22 can also be formed as a milling head, which can be rotated by an electric motor or the like. Alternatively, a third tool in the form of a milling head between the two tools 19 and 22 can be fixed on the bracket 18 and be mounted in a similar way to the tool 22 movable in the z-direction by an additional cylinder/piston arrangement. It is then possible so to move the bracket 18 in a first step that, after the stamping operation, the milling head is next aligned with the stamped hole and is used to machine this. In a second step, the bracket 18 can be shifted again as necessary, in order to position the tool 22 under the stamped hole in the manner described above and to fit the adapter. However it would alternatively be possible to perform the last-mentioned processing in a second processing station.

A particular advantage of the described apparatus lies in that, after a one-time adjustment of the relative positions and distances of the tools 19, 22, 24, 25, only the bracket 18 has to be moved to and fro with a stroke adapted to them. This can be effected with a very high accuracy, in particular a higher accuracy than a displacement of the plastics part 10.

The invention is not limited to the described embodiment, which can be modified in many ways. In particular it would be possible according to an embodiment regarded as the best at present to fix the hold-down 25 on a bracket holding the stamp 24 by means of a further cylinder/piston arrangement, so that it can be moved up and down in the z-direction, independently of the stamp 24. Furthermore, a plurality of processing stations 12 per interchangeable module 7 can be provided, as FIGS. 2 and 3 show for example. In addition additional tools can be present in each interchangeable module 7, adapted only for milling/welding/bonding or for quite different processing functions. There is always the advantage that all processing steps can be effected without altering the position of the plastics parts 10 or the holder 9 at the same processing sites on the plastics parts provided for example by a stamping axis. Alternatively, it is also possible to arrange two or more suitably prepared interchangeable modules or interchangeable module sections in one base rack 2, in which case these and optionally also the base rack 2 are advantageously provided with cooperating positioning means, in order to avoid troublesome fine adjustments of the interchangeable modules or interchangeable module sections relative to one another. The holder 9 can in this case be assembled from a number of sections corresponding to the number of interchangeable modules or interchangeable module sections. It would also be possible to effect the movement of the bracket 18, by means of which tools fixed thereon are brought one after the other into the respective working positions by means of means other than those illustrated and to replace the illustrated linear movement by a rotary movement for example. Furthermore, it would be possible to do away with the separate control cabinet 3 and instead to integrate the assemblies present therein in the base rack 2. Finally it will be understood that the various features can also be used in combinations other than those described and shown.

The invention claimed is:

1. An apparatus for sequentially effected performance of stamping and milling, welding and/or bonding operations on large area, three-dimensional plastics parts (10) for motor vehicles, especially fenders, comprising: at least one holder (9) for the plastics parts (10), said at least one holder (9) being stationary arranged; an underneath tool (16); an upper tool (17), said underneath tool (16) and said upper tool (17) being provided with tools (19, 22 and 24, 25 respectively) which are mounted movably at least partially parallel to or in the direction of a predetermined axis (z), a bracket (18) on which said tools (19, 22 and 24, 25 respectively) of said underneath tool (16) or said upper tool (17) are mounted, and means (21) for moving said bracket (18) transversely to said axis (z) so that one of said underneath tools (16) and said upper tool (17) is moved to the plastic parts and some of said tools (19, 22 and 24, 25 respectively) firstly provide the plastics parts (10) with a stamped hole and then the other of said underneath tool (16) and said upper tool (17) is moved to the plastic parts and other of said tools (9, 22 and 24, 25 respectfully) and perform at least one further processing step in the region of the stamped hole by milling, welding and/or bonding, whereby the means for moving the bracket (18) bring the tools (19, 22 and 24, 25 respectively) mounted thereon successively into an operating position, which is established by a predetermined working site of the plastics part (10).

2. The apparatus according to claim 1, wherein the underneath tool (16) comprises a tool (19) in the form of a die for the stamping.

3. The apparatus according to claim 2, wherein the further tool (22) is a rotatably mounted milling head.

4. The apparatus according to claim 1, wherein the underneath tool (16) includes at least one further tool (22) for milling, welding or bonding.

5. The apparatus according to claim 4, wherein the further tool (22) is a sonotrode for performing welding operations 6. The apparatus according to claim 4, wherein the further tool (22) is a pressure plate for performing bonding operations.

7. The apparatus according to claim 4, wherein the further tool (22) is provided with an arbor (28) adapted for fitting on adapters.

8. The apparatus according to claim 4, wherein the further tool (22) is mounted for movement parallel to the axis (z) on the bracket (18).

9. The apparatus according to claim 8, wherein a cylinder/piston arrangement (23) is provided for moving the further tool (22).

10. The apparatus according to any of claims 1 to 6, and further comprising a guide (20) running transversely and inclined downwards, along which the bracket (18) is movably mounted.

11. The apparatus according to claim 10, wherein the means for moving the bracket (18) is a cylinder/piston arrangement (21).

12. The apparatus according to claim 1, and further comprising a stationary frame (15) with a guide (26) on which the upper tool (17) is movable up and down parallel to a stamping axis (z).

13. The apparatus according to claim 1, wherein the upper tool (17) comprises a tool (24) in the form of a stamp.

14. The apparatus according to claim 13, wherein the upper tool (17) comprises a tool in the form of a hold-down (25) for the plastics parts (10) movable towards and back from the holder (9).

15. The apparatus according to claim 14, wherein the hold-down (25) is mounted movably relative to the stamp (24) on the upper tool (17).

16. The apparatus according to claim 15, wherein the upper tool (17) comprises a tool (24) in the form of a sonotrode adapted for the stamping.

17. The apparatus according to claim 13, wherein a cylinder/piston arrangement (27) is provided for moving the upper tool (17).

18. The apparatus according to claim 1, and further comprising a base unit (1) which is provided with at least one device adapted to operate the tools (15, 22, 24, 25), and being selected from a group consisting of electrical, electronic and/or pneumatic devices, as well as with supply lines for the tools (19, 22, 24, 25) connected to the at least one device, wherein the holder (9), the underneath tool (16) and the upper tool (17) form a processing station (12) which is a component of an interchangeable module (7) which can be fitted interchangeably as a whole in the base unit (1), and wherein the tools (19, 22, 24, 25) are provided with connector elements adapted for connection to the supply lines.

19. The apparatus according to claim 18, including a plurality of processing stations (12) which can be attached to the supply lines and which are combined into at least two separate interchangeable modules (7) which can be fitted in the base unit, wherein the interchangeable modules (7) and optionally also the base unit (1) are provided with positioning means cooperating for positional fixing of the interchangeable modules (7) relative to one another.

20. The apparatus according to claim 18, including a plurality of processing stations (12) which can be attached to the supply lines and which are fitted in a common interchangeable module (7) which can be fitted interchangeably in the base unit (1) and be aligned therein relative to the holder (9) and relative to one another.

21. The apparatus according to claim 18, wherein the base unit (1) includes a base rack (2) adapted to receive at least one interchangeable module (7) and a control cabinet (3) receiving the electrical, electronic and/or pneumatic devices.

22. The apparatus according to claim 18, including means for automatic exchange of the interchangeable modules (7).

* * * * *